(No Model.) 3 Sheets—Sheet 1.

H. FAULDER.
COFFEE ROASTING APPARATUS.

No. 252,933. Patented Jan. 31, 1882.

Witnesses

Inventor
Henry Faulder (No Model.) 3 Sheets—Sheet 2.

H. FAULDER.
COFFEE ROASTING APPARATUS.

No. 252,933. Patented Jan. 31, 1882.

Witnesses
Hugh G. Grant
Ferdinand Bosshardt

Inventor
Henry Faulder (No Model.) 3 Sheets—Sheet 3.

H. FAULDER.
COFFEE ROASTING APPARATUS.

No. 252,933. Patented Jan. 31, 1882.

UNITED STATES PATENT OFFICE.

HENRY FAULDER, OF STOCKPORT, COUNTY OF LANCASTER, ENGLAND.

COFFEE-ROASTING APPARATUS.

SPECIFICATION forming part of Letters Patent No. 252,933, dated January 31, 1882.

Application filed June 13, 1881. (No model.) Patented in England September 2, 1879.

*To all whom it may concern:*

Be it known that I, HENRY FAULDER, a subject of the Queen of Great Britain, residing at Stockport, in the county of Lancaster, Kingdom of Great Britain, have invented a new and useful Coffee-Roasting Apparatus, (for which I have obtained a patent in Great Britain, No. 3,507, bearing date September 2, 1879,) of which the following is a specification.

My invention relates to improvements in coffee-roasting apparatus in which a revolving cylinder containing the coffee to be roasted is heated by means of a burner supplied with a mixture of gas and air; and the objects of my improvements are, first, to supply the burner with gas and air under pressure, and, secondly, to expedite and improve the roasting process. I obtain these objects by the apparatus illustrated in part on the accompanying sheets of drawings, in which—

Figure 1:
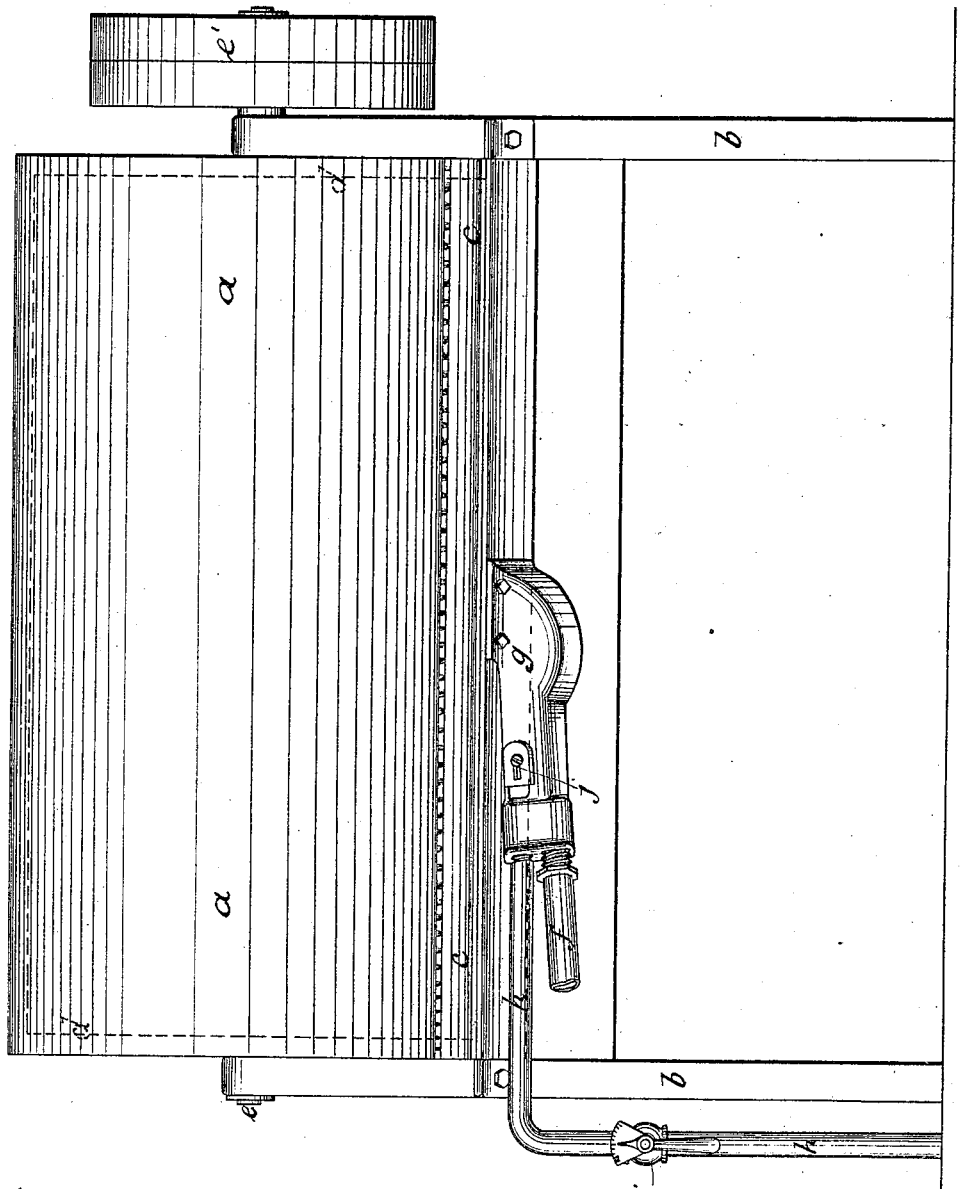
Figure 2:
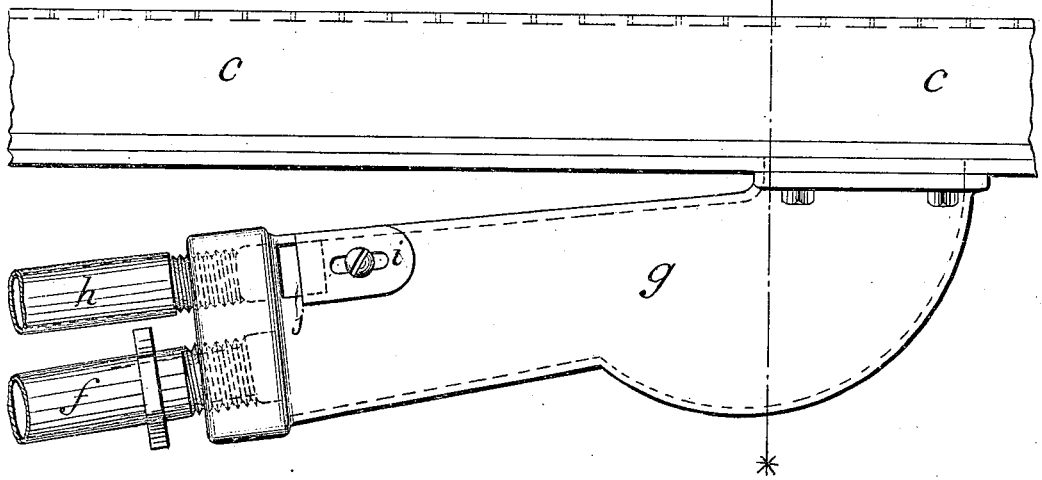
Figure 3:
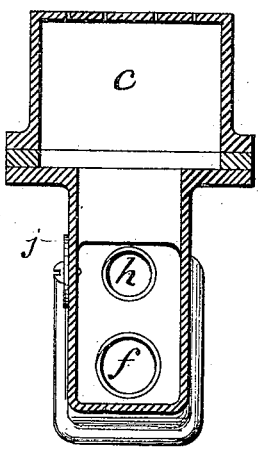
Figure 4:
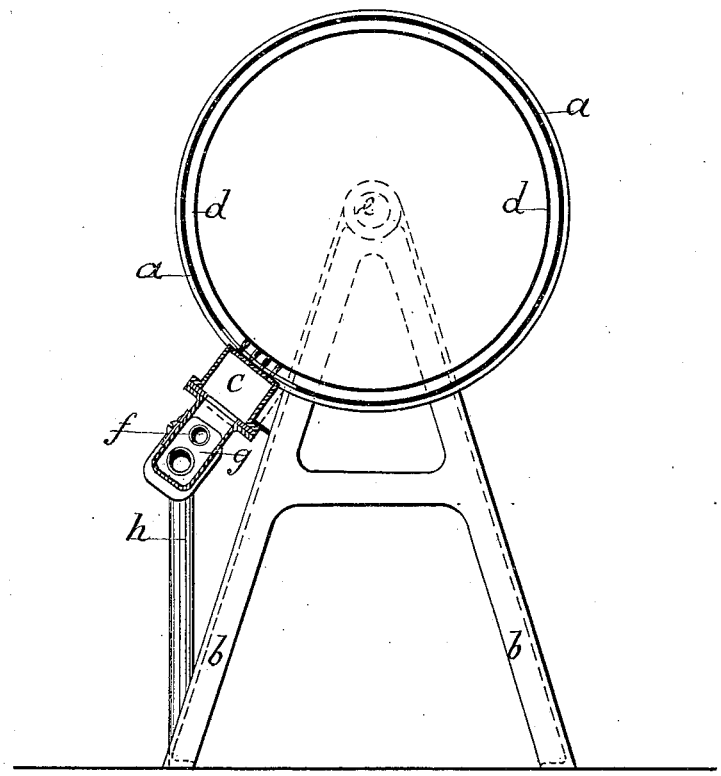

Figure 1 is a front view of the roasting-cylinder and gas and air burner. Fig. 2 is a front view of the burner, drawn as when removed from the cylinder. Fig. 3 is a cross-section on the line * * in Fig. 2.

The cylinder $a$, supported on legs or standards $b$, is heated by means of the gas and air burner $c$. Within the cylinder $a$ a revolving cylinder, $d$, containing the charge of coffee to be roasted, is mounted on the axis $e$, on which pulleys $e'$ are fixed and driven from any suitable motor. I supply a current of air to the burner $c$ under a greater pressure than the gas-supply through the air-pipe $f$, which is screwed into one end of a chamber, $g$, bolted to the under framing of the rectangular box forming the burner, the burner $c$ being formed with a series of perforations or jets. The air is forced through the pipe $f$ and into the burner $c$ by means of an air-pump. The gas flows through the pipe $h$, which is screwed into the chamber $g$. The gas and air mix together in the chamber $g$, and are carried to the burner $c$ by the said forced blast of air, which urges the flame to an intense heat. The pipe $h$ is supplied with a gas-regulating valve, $i$. An air-inlet opening, $j$, is formed in the chamber $g$, and is provided with a sliding cover for the purpose of regulating the admission of atmospheric air into the chamber $g$. By these means the coffee is better roasted, and a greater percentage or "return" of coffee obtained, combined with expediency in roasting.

I am aware that prior to my invention gas and atmospheric air has been used in connection and combined with coffee-roasting apparatus. I therefore do not claim such a combination, broadly; but What I do claim as my invention, and desire to secure by Letters Patent, is—

The combination of the revolving cylinder $b$, outer casing, $a$, burner-chamber $c$, valved mixing-chamber $g$, valved pipe $h$, and air-pump, for the purpose specified.

HENRY FAULDER.

Witnesses:
HUGH G. GRANT,
FERDINAND BOSSHARDT.